(12) United States Patent
Snyder et al.

(10) Patent No.: US 9,190,676 B2
(45) Date of Patent: Nov. 17, 2015

(54) FLAME STABILIZED MIXER-EDUCTOR-OXIDIZER FOR HIGH TEMPERATURE FUEL CELLS

(71) Applicant: FUELCELL ENERGY, INC., Danbury, CT (US)

(72) Inventors: William J. Snyder, Ossining, NY (US); Michael L. Quatannens, Ridgefield, CT (US); Dennis R. Farrenkopf, Bethel, CT (US)

(73) Assignee: FUELCELL ENERGY, INC., Danbury, CT (US)

( * ) Notice: Subject to any disclaimer, the term of this patent is extended or adjusted under 35 U.S.C. 154(b) by 422 days.

(21) Appl. No.: 13/630,810

(22) Filed: Sep. 28, 2012

(65) Prior Publication Data

US 2014/0093798 A1    Apr. 3, 2014

(51) Int. Cl.
| | |
|---|---|
| *H01M 8/04* | (2006.01) |
| *H01M 8/18* | (2006.01) |
| *H01M 8/06* | (2006.01) |
| *H01M 8/12* | (2006.01) |

(52) U.S. Cl.
CPC ...... *H01M 8/04097* (2013.01); *H01M 8/04022* (2013.01); *H01M 8/06* (2013.01); *H01M 8/12* (2013.01); *H01M 8/18* (2013.01); *Y02E 60/521* (2013.01); *Y02E 60/525* (2013.01); *Y02E 60/528* (2013.01)

(58) Field of Classification Search
None
See application file for complete search history.

(56) References Cited

U.S. PATENT DOCUMENTS

| | | | |
|---|---|---|---|
| 7,416,799 B2 | 8/2008 | Tang et al. | |
| 2002/0155331 A1 | 10/2002 | Kamegaya et al. | |
| 2004/0126724 A1* | 7/2004 | Yamaguchi et al. | 431/2 |
| 2008/0118795 A1* | 5/2008 | Yoshikata et al. | 429/19 |
| 2009/0197141 A1 | 8/2009 | Nakakubo | |

FOREIGN PATENT DOCUMENTS

| | | |
|---|---|---|
| JP | 2002-151128 A | 5/2002 |
| WO | 2005/081709 A2 | 9/2005 |

OTHER PUBLICATIONS

International Search Report of International Application No. PCT/US2013/062232 issued on Dec. 24, 2013, which is enclosed.

* cited by examiner

*Primary Examiner* — Miriam Stagg
*Assistant Examiner* — Carmen Lyles-Irving
(74) *Attorney, Agent, or Firm* — Foley & Lardner LLP (57) ABSTRACT

A mixer/eductor assembly for use with a fuel cell stack, the mixer/eductor assembly mixing and at least partially combusting anode exhaust gas output from an anode-side of the stack and an oxidant supply gas, the mixer/eductor assembly comprising: a first area mixing a first portion of the anode exhaust gas and a first portion of the oxidant supply gas to form a first mixture, the first area being configured to initiate a combustion reaction in the first mixture, a second area coupled with the first area for mixing a second portion of the anode exhaust gas and a second portion of the oxidant supply gas to form a second mixture, wherein the first mixture has a first oxidant to fuel ratio smaller than a second oxidant to fuel ratio of the second mixture, and the first area provides an ignition source to promote continuous combustion of the second mixture.

8 Claims, 4 Drawing Sheets

FLAME STABILIZED MIXER-EDUCTOR-OXIDIZER FOR HIGH TEMPERATURE FUEL CELLS

BACKGROUND OF THE INVENTION

1. Field of the Invention

This invention relates to improving the performance of a high temperature fuel cell power plant, and, in particular, to enhancing the stability of a combustion reaction in a mixer/eductor/oxidizer system when mixing anode-outlet or exhaust gas with inlet air or oxidant gas for supply to the stack cathode side.

2. Description of the Related Art

A fuel cell is a device that directly converts chemical energy stored in any hydrogen or hydrocarbon containing fuel such as hydrogen, methane, or natural gas into electrical energy by means of an electrochemical reaction. This differs from traditional electric power generating methods which must first combust the fuel to produce heat and then convert the heat into mechanical energy and finally into electricity. The more direct conversion process employed by a fuel cell has significant advantages over traditional processes in both increased efficiency and reduced pollutant emissions.

In general, a fuel cell, similar to a battery, includes a negative or anode electrode and a positive or cathode electrode separated by an electrolyte that serves to conduct electrically charged ions between them. In contrast to a battery, however, a fuel cell will continue to produce electric power as long as fuel and oxidant are supplied to the anode and cathode, respectively. To achieve this, gas flow fields are provided adjacent to the anode and cathode through which fuel and oxidant gas are supplied. In order to produce a useful power level, a number of individual fuel cells are stacked in series with an electrically conductive separator plate between each cell and its neighbor.

In high temperature fuel cell stacks, fresh air usually serves as oxidant and is provided at the entry of the cathode-side of the stack. This fresh air is typically at ambient temperature and must be heated to the operating temperature of the stack. Conventionally, unused fuel in the exhaust gas exiting from the anode-side of the stack and incoming fresh air are burned to heat the air. In order to ensure complete reaction of fuel and to minimize temperature gradients, the anode-exhaust must be completely mixed with air.

It is also desirable to minimize the pressure differential of the gases passing through the anode and cathode sides of the stacks in order to provide and maintain seals to keep the fuel and oxidant gases isolated from each other. To create the required seals, surfaces, which in some cases sandwich a gasket, are mechanically forced together to realize an "acceptable" leak rate. This leak rate is a function of the pressure differential. Therefore, minimizing the pressure differential is important to prevent excessive leaks.

During operation of the fuel cell stack, at a junction of the two process gas streams, gas pressure at the exit of the anode-side of the stack is coupled to gas pressure at the inlet of the cathode-side of the stack. Typically, the pressure at the exit of the anode-side is necessarily higher than the pressure at the inlet of the cathode-side by an amount required to overcome pressure losses associated with any connection piping and with the oxidizer used to burn the anode exhaust and incoming oxidant gases.

A mixer/eductor/oxidizer (MEO) system has been introduced into molten carbonate fuel cells to address both the gas mixing and the pressure differential problems. The MEO system oxidizes unconverted anode fuel, preheats inlet air, recycles carbon dioxide ($CO_2$) to the cathode, and reduces the pressure difference between the anode and cathode gas streams. However, the unconverted anode fuel BTU levels vary at different operating power levels of the fuel cell stack. Maintaining required outlet temperatures to accommodate cathode side operational requirements and oxidizer bed catalyst temperatures requires adjusting the amount of additional air to be provided to the fuel cell. Swings in ambient temperatures and blower capacity limitations impact the delicate balance of many parameters required for desired fuel cell stack operation.

Applicants found that igniting and burning anode exhaust and incoming air, while mixing, prior to the mixture passing through the catalyzed oxidizer bed, would improve the fuel cell system performance. However, maintaining this "pre-ignition" state in a conventional mixer/eductor/oxidizer for all operating conditions of the fuel cell stack has been difficult. Specifically, once a fuel system has been designed and built, operational changes in the system are the primary means to establish and maintain pre-ignition in the eductor. To enhance the stability of pre-ignition, the following operational adjustments may be made: (i) reducing fuel utilization to increase the BTU content of the unspent fuel, (ii) reducing the airflow to make combustion less lean and to reduce air inlet velocity, and/or (iii) raising the overall temperatures to improve reactivity. However, all these operational solutions have deleterious consequences to the overall operation of the fuel cell stack.

In particular, reduction in the fuel utilization negatively affects the overall system efficiency (power produced/fuel consumed), and further affects the amount of cooling air required and the overall fuel cell stack temperatures. Reduction in the airflow usually increases power consumption by the blower. This is because the fuel cell stack continues to require the same amount of air to maintain the overall temperature and diverting some of the airflow away from the eductor results in higher pressure drop paths for injecting the air to other parts of the fuel cell system. The increase in the power consumption by the blower reduces the total power produced by the fuel cell stack. Raising fuel cell operating temperature impacts the fuel cell stack performance and its operating life, and increases heat losses from the fuel cell module.

Addressing the "pre-ignition" state problem using conventional equipment designs has also been impractical. This is because MEOs in typical fuel cell systems run very fuel lean. The typical operating range of MEOs has an air/oxidant to fuel ratio between 500% and 700% of a stoichiometric ratio, which results in very low temperatures and unstable flames. For example, U.S. Pat. No. 6,902,840, assigned to the same assignee hereof, discloses a basic mixer/eductor system for the high temperature fuel cells, which is adapted to provide both the desired mixing of oxidant gas or air and the anode exhaust gas and a reduced pressure difference between the gas at the cathode-side inlet and the gas at the anode-side outlet of the fuel cell stack. International application PCT/US2004/037889, also assigned to the same assignee hereof, discloses an improved mixer/eductor, the performance of which is improved by refined eductor nozzle configurations. Although the '840 patent highlighted the benefits of achieving a pre-ignition state in the mixer/eductor, a stable and continuous pre-ignition state using the mixer/eductor configurations of the '840 patent and of the '889 application has been difficult to achieve.

SUMMARY OF THE INVENTION

It is, therefore, an object of the present invention to provide a more reliable fuel cell system that is able to achieve peak operating efficiencies through its life. It is a further object of the present invention to enhance the stability of the combustion reaction in the mixer/eductor of the MEO system and to allow full realization of the MEO system benefits over a wider operating range of the fuel cell system.

In accordance with the principles of the present invention, the above and other objectives are realized in a mixer/eductor assembly for use with a fuel cell stack having an anode-side and a cathode-side, said mixer/eductor assembly mixing and at least partially combusting anode exhaust gas output from the anode-side and an oxidant supply gas, said mixer/eductor assembly comprising: a first area receiving and mixing a first portion of the anode exhaust gas and a first portion of the oxidant supply gas to form a first mixture, the first area being configured so as to initiate a combustion reaction in the first mixture; a second area coupled with the first area, the second area receiving and mixing a second portion of the anode exhaust gas and a second portion of the oxidant supply gas to form a second mixture, wherein: the first mixture has a predetermined oxidant to fuel ratio smaller than the oxidant to fuel ratio of the second mixture; and the first area provides an ignition source to promote continuous combustion of the second mixture in the second area.

The first area of the mixer/eductor assembly is smaller than the second area and is disposed within the second area. The first portion of oxidant supply gas mixed in the first area is typically between 0.5 percent and 10 percent of the oxidant supply gas. The temperature in the first area during operation of the mixer/eductor assembly is higher than the temperature in the second area. In certain embodiments, the oxidant to fuel ratio of the first mixture in the first area is between 50 percent and 200 percent of a stoichiometric ratio and the oxidant to fuel ratio of the second mixture in the second area is between 500 percent and 700 percent of the stoichiometric ratio during full power operation and between 500 percent and 2200 percent of the stoichiometric ratio during hot standby operation. More specifically, the oxidant to fuel ratio of the first mixture is about 100 percent of the stoichiometric ratio or less when the fuel cell system is at a hot standby power level, which is a zero power level, and the oxidant to fuel ratio of the first mixture is not more than 200 percent of the stoichiometric ratio when the fuel cell system is at full power operation.

In the illustrative embodiments described, the first area of the mixer/eductor comprises one or more first air nozzles adapted to receive the first portion of the oxidant supply gas and to form one or more first oxidant streams, and the second area comprises one or more second air nozzles adapted to receive the second portion of the oxidant supply gas and to form one or more second oxidant streams. The first air nozzles are configured so as to form the first oxidant streams upstream in relation to the one or more second oxidant streams formed by the second air nozzles. Moreover, the first area includes a housing enclosing the first air nozzles and defining one or more anode exhaust inlets, and the one or more first oxidant streams formed by the one or more first air nozzles entrain the first portion of the anode exhaust gas through the one or more anode exhaust inlets. In certain embodiments, the first area further includes one or more flame retention members extending into a path of gas flow in the first area for enhancing stability of the flame. In some embodiments, the one or more anode exhaust inlets are disposed in predetermined locations and have predetermined sizes so as to achieve the desired oxidant to fuel ratio in the first area. In the illustrative embodiments shown, the one or more first air nozzles are disposed within the housing at regular intervals, and the one or more second air nozzles are disposed around the housing in the second area at regular intervals.

The first and second portions of anode exhaust gas are provided to the first and second areas, respectively, either from a common exhaust supply line and/or common plenum, or from separate exhaust supply lines. Similarly, the first and second portions of oxidant supply gas are provided to the first and second areas, respectively, either from a common oxidant supply line or from separate oxidant supply lines. In some embodiments, the mixer/eductor assembly also includes a control assembly for controlling at least one of: (1) the oxidant supply gas flow provided to the mixer/eductor assembly and (2) the flows of the first and second portions of the oxidant supply gas provided to the respective first and second areas, such that the first mixture has the predetermined oxidant to fuel ratio in the first area. In some embodiments, the control assembly also controls at least one of: anode exhaust gas flow provided to the mixer/eductor assembly and the flows of the first and second portions of anode exhaust gas provided to the respective first and second areas.

A fuel cell system with the mixer/eductor assembly having the above-mentioned features is also described. The fuel cell system may also include an oxidizer assembly following the mixer/eductor assembly and receiving partially combusted gas mixture output from the mixer/eductor assembly. The oxidizer assembly oxidizes the partially combusted gas mixture and outputs oxidant gas to the cathode-side of the fuel cell system.

A fuel cell module that includes two or more fuel cell stacks and having a mixer/eductor assembly having the above-mentioned features is also described. In the fuel cell module, the mixer/eductor assembly processes gases output from multiple fuel cell stacks and provides oxidant gas for use in the cathode-sides of multiple fuel cell stacks of the module. In certain embodiments, multiple mixer/eductor assemblies may be used in the fuel cell module depending on the number of fuel cell stacks included in the module and the requirements of the module.

A mixing/educting method for use with a fuel cell system having an anode-side and a cathode-side and for mixing and at least partially combusting anode exhaust gas output from the anode-side and an oxidant supply gas is also described.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
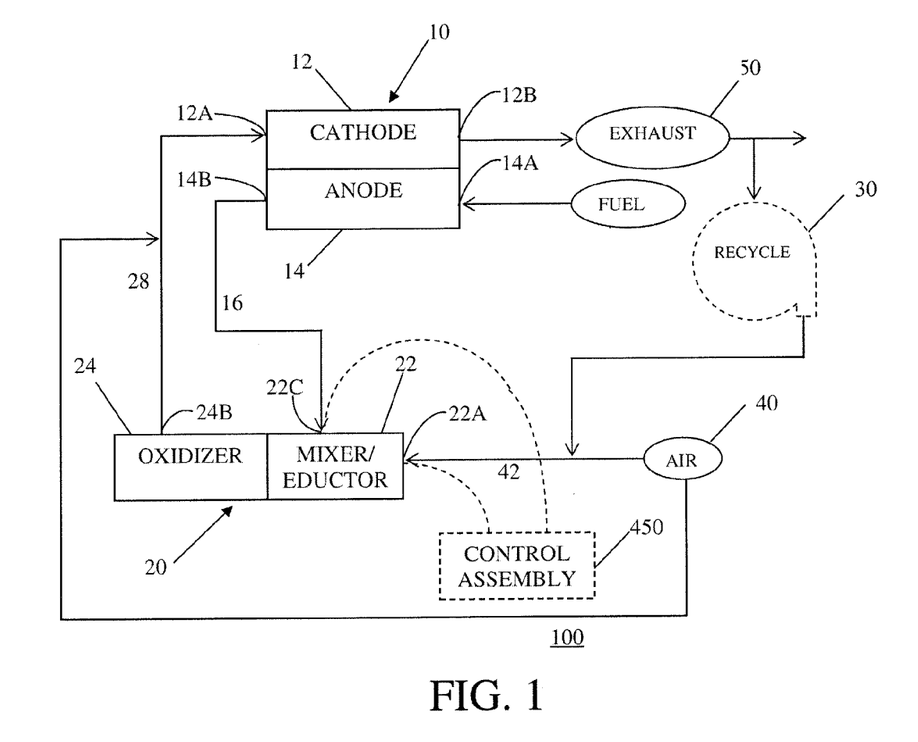
FIG. 1 is a block diagram showing a fuel cell system including a mixer/eductor/oxidizer (MEO) system in accordance with the principles of the present invention.

FIG. 1 is a block diagram showing schematically a fuel cell system 100 that uses a mixer/eductor/oxidizer system of the present invention. The system 100 includes a fuel cell 10, having anode and cathode sections 14 and 12 respectively, and a recycle blower 30. The recycle blower 30 is optional and is omitted in some systems. As can be appreciated, the fuel cell 10 is typically in the form of a stack including a plurality of individual fuel cells stacked so that fuel and oxidizing gas/air are supplied to the anode and cathode sections, respectively, of the stack. The fuel cell system 100 also includes a mixer/eductor/oxidizer (MEO) system 20 in accordance with the principles of the present invention.

In some embodiments of the fuel cell system, the system 100 is a fuel cell module which includes a plurality of fuel cell stacks, typically disposed within a containment or housing unit. The module also includes at least one mixer/eductor/oxidizer (MEO) system of the present invention which processes gases from one or more fuel cell stacks of the module. In some embodiments, the module includes one MEO system to process gases from the plurality of fuel cell stacks and for delivering oxidant gas to the cathode sides of the plurality of fuel cell stacks. The MEO system in such embodiments may be disposed centrally with respect to the fuel cell stacks or in any other predetermined position relative to the fuel cell stacks so as to optimize the flow of anode exhaust to the MEO system from the fuel cell stacks and the flow of oxidant from the MEO system to the fuel cell stack cathodes. In other embodiments, the module include multiple MEO systems, each of which processes gases from one or more of the fuel cell stacks and delivers oxidant gas to the cathode sides of one or more fuel cell stack. The number of MEO systems in the module is dependent on the number of stacks included in the module and the gas flow and other requirements.

As shown, all or a portion of oxidant exhaust gas 50 output from an outlet 12B of the cathode-side section 12 is recycled by the recycle blower 30 and in some embodiments, combined with fresh air 40 to produce an oxidant supply gas 42. The oxidant supply gas 42 is fed to an oxidant inlet 22A of the mixer/eductor 22 of the MEO system 20. The amount of oxidant exhaust gas 50 recycled by the recycle blower 30 to the MEO and the amount of fresh air 40 mixed with the oxidant exhaust gas 50 is controlled by a controller, which may be part of a control assembly 450 or a separate controller (not shown), so as to achieve desired thermal conditions in the MEO and the stack. For example, when additional cooling is needed in the MEO and/or in the fuel cell stack, more fresh air 40 is mixed with the oxidant exhaust 50, or only fresh air 40 may be used as the oxidant supply gas 42 for the MEO. Alternatively, if additional heating is needed in the MEO and/or in the fuel cell stack, then more oxidant exhaust gas 50 is recycled to produce the oxidant supply gas 42 and less or no fresh air is supplied for the oxidant supply gas.

As discussed below in greater detail, when passing through the mixer/eductor 22, the oxidant supply gas 42 entrains anode exhaust gas 16 entering the mixer/eductor 22 via a fuel inlet 22C, is reduced in gas pressure and increased in temperature. Mixed gases from the mixer/eductor 22 continue into the oxidizer 24, where unspent fuel in the anode exhaust gas of the mixed gases is burned or oxidized, thereby raising the temperature of the gas stream. The outlet gas stream 28 from the MEO system 20 is delivered to the cathode inlet 12A of the cathode section 12, while fuel gas is delivered to the anode inlet 14A of the anode section 14. As shown in FIG. 1, in some embodiments, the outlet gas stream 28 may be mixed with a predetermined amount of fresh air 40 before being supplied to the cathode inlet 12A. The amount of fresh air 40 provided to be mixed with the outlet gas stream 28 is controlled so as to control the temperature of the oxidant gas supplied to the cathode inlet 12A.

Generally, the purpose of the MEO system 20 is to oxidize unspent fuel 16 present in the anode exhaust gas output from the anode section 14, to preheat the cathode inlet gas 28, and to reduce the pressure difference between the anode exhaust gas at the outlet 14B of the anode section 14 and the cathode inlet gas at the inlet 12A of the cathode section 12. More specifically, in accordance with the described invention, the mixer/eductor 22 ignites and starts burning the unspent fuel and air/oxidant supply gas prior to conveying the mixture through the oxidizer 24. This improves the overall performance of the MEO system 20 by reducing condensation of vapors on a catalyst bed of the oxidizer 24 and improving the temperature distribution in the fuel cell system or module.

The mixer/eductor 22 of the present invention also enhances the stability of the combustion reaction in the mixer/eductor 22. In particular, the combustion process in the mixer/eductor 22 is segregated into two areas: a first smaller high temperature area and a second larger lower temperature area. The first smaller area is stable over a wide range of the fuel cell operating conditions and serves as a stable burner area. In particular, the first smaller area provides a high temperature ignition source that promotes a continuous combustion reaction in the second larger area, which may be less stable at some operating conditions and which serves as the main area for mixing the anode-outlet or exhaust gas with oxidant supply gas. Various features of the MEO system 20, the mixer/eductor 22 and the stable/main burner configuration are described below in greater detail.

Figure 2:
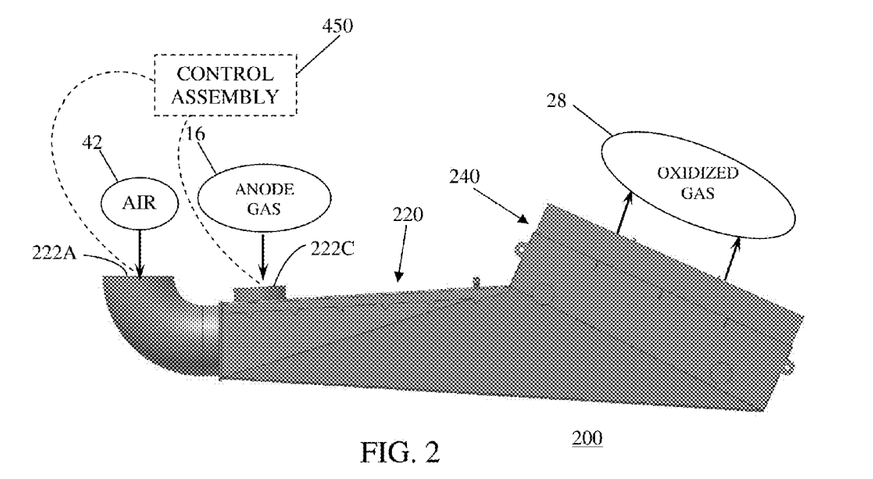
FIG. 2 depicts the MEO system in accordance with the principles of the present invention.
Figure 3:
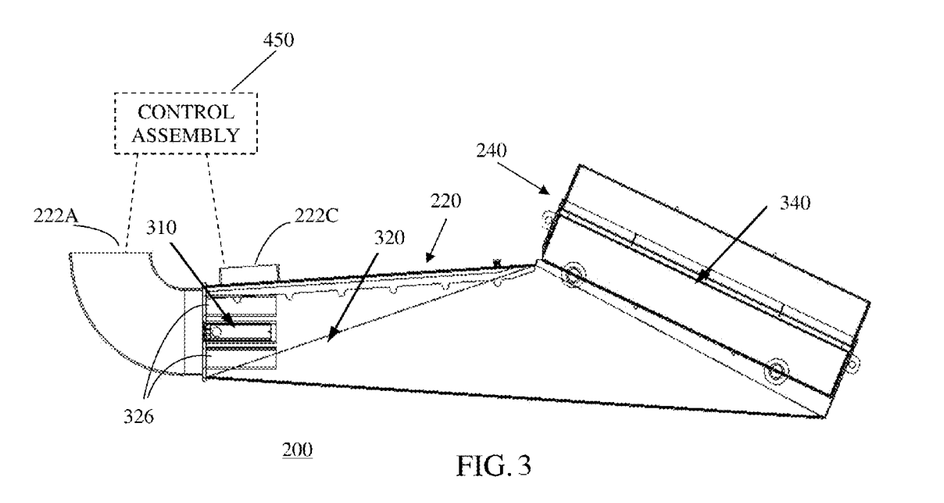
FIG. 3 is a cross-sectional view of the MEO system shown in FIG. 2.

FIGS. 2 and 3 show an illustrative embodiment of the MEO system 20, which generally includes a mixer/eductor 220 and an oxidizer 240 coupled with the mixer/eductor 220 and receiving partially combusted gas mixture output from the mixer/eductor 220. The mixer/eductor 220 includes two inlets, a primary oxidant inlet 222A for receiving the oxidant supply gas comprising air and/or recycled oxidant exhaust gas and an anode gas inlet 222C for receiving anode exhaust gas comprising unspent fuel from the anode section. The oxidizer 240 includes an oxidation catalyst bed 340 for burning or oxidizing the unspent fuel in the mixed gas stream received from the mixer/eductor 220 to produce heated oxidant gas which is then supplied to the cathode inlet of the cathode section.

To enhance the stability of the combustion reaction within the mixer/eductor 220, the mixer/eductor 220 is segregated into two areas: the first smaller high temperature area (first area 310) and the second larger lower temperature area (second area 320). The first area 310 is a burner area that is stable over a wide range of fuel cell operating conditions. The first area 310 serves as a high temperature ignition source, and as a result, promotes continuous combustion in the second area 320 which is less stable at some operating conditions. Generally, the first area 310 receives, from the inlet 222A, a first portion of oxidant supply gas while the second area 320 receives a second portion of oxidant supply gas. The first portion of oxidant supply gas has a smaller volume and is supplied at a lower flow rate than the second portion of oxidant supply gas, and the first portion entrains a larger proportion of the unspent fuel 16 received from the anode section of the fuel cell. The proportion of the received first portion of the oxidant supply gas and of the unspent fuel is such that after the received oxidant supply gas and unspent fuel are mixed, the overall stoichiometry of the mixture in the first area is close to 100% of the stoichiometric ratio and preferably, not greater than 200% of the stoichiometric ratio. In order to achieve 100% stoichiometric operation at full power operation of the fuel cell system or module, the oxidant to fuel ratio is 0.423 volume oxidant per volume of anode exhaust gas or 0.435 mass oxidant per mass of anode exhaust gas. Additionally, the first area 310 has a greater proportion of the high temperature unspent fuel gas relative to the lower temperature oxidant supply gas than the second area 320, and thus, the average temperature of the gas stream within the first area 310 is higher than in the second area 320.

To minimize the velocity of the mixed gas stream and prevent dilution of the stream by oxidant supply gas or unspent fuel, as the stream progresses forward within the first area 310, the gas stream in the first area 310 is isolated from the gas stream in the second area 320. As discussed below in greater detail, in some embodiments, the first area 310 is enclosed in a housing, such as a properly sized tube or shroud, to ensure that the appropriate amount of mixing occurs within the first area 310 and that the gas velocity is sufficiently low to prevent blowing off the combustion reaction.

The second area 320 surrounds and partially or wholly encloses the first area 310, thereby providing for close coupling between the two areas. The second area 320 receives the second portion of the oxidant supply gas via a plurality of second nozzles 326 from the inlet 222A and utilizes jet streams formed by the second nozzles 326 to entrain the remaining portion of the anode exhaust 16 output from the anode section of the fuel cell. This results in a lean gas mixture (having an oxidant to fuel ratio of 500-700% of the stoichiometric ratio) in the second area 320. For example, a lean mixture in which the oxidant to fuel ratio is 500% of the stoichiometric ratio has 2.115 volume of oxidant per volume of fuel or 2.175 mass of oxidant per mass of fuel. As shown in FIGS. 2-3, a first gas mixture in the first area 310 which undergoes the combustion reaction is output from the first area into the second area 320. In this way, the combustion reaction in the first area 310 and the energy released from the first area 310 propagates the combustion reaction in the second area 320 and makes the total combustion process stable. The combustion reaction in the first area 310 results from a spontaneous ignition due to the high temperature fuel and oxidant available during the heatup and/or hot standby conditions.

Figure 4:
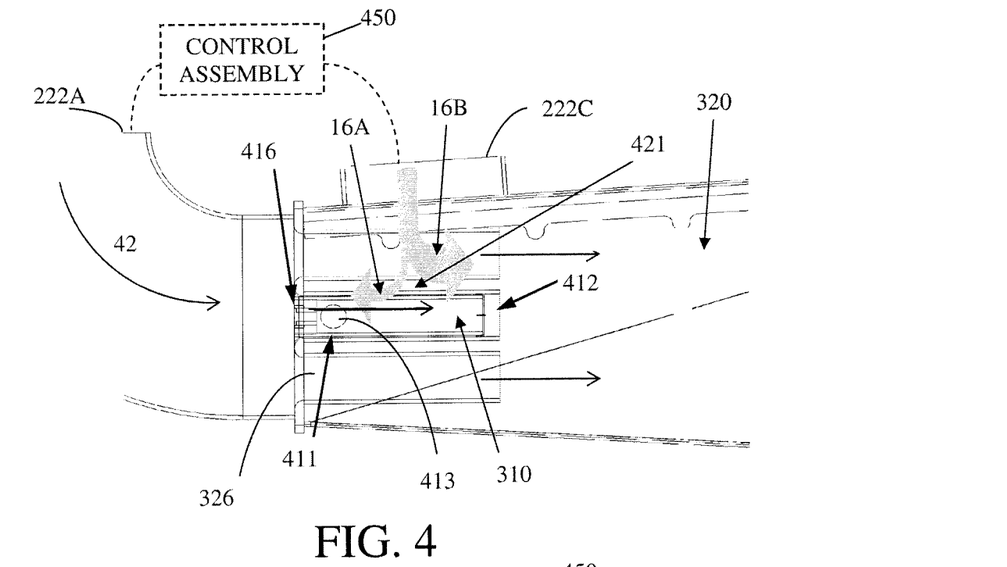
FIG. 4 is a cross-sectional view of a first area of the MEO system shown in FIG. 2.
Figure 5:
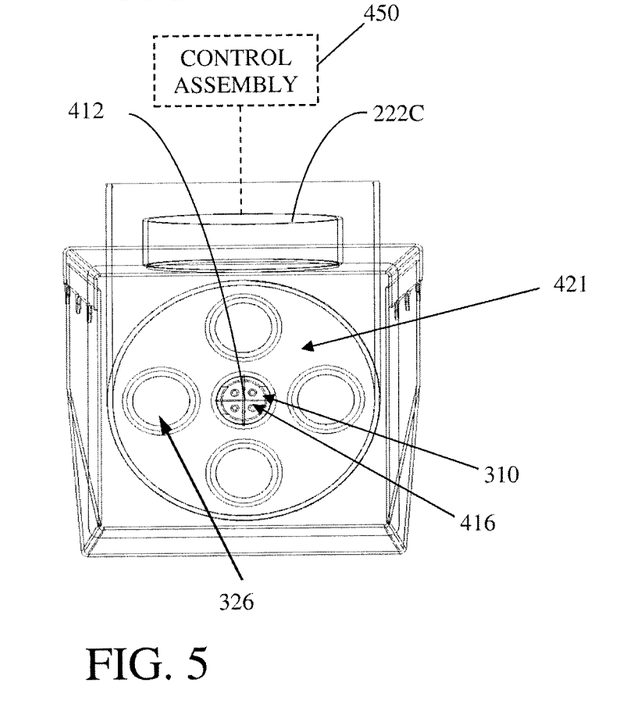
FIG. 5 is an isometric end view of the first area of FIG. 4.

FIG. 4 shows a cross-sectional view of the first area 310 and a portion of the second area 320, while FIG. 5 shows an isometric end view of the first area 310 surrounded by the second area 320. As shown, the first area 310 is surrounded by the second area 320 and is enclosed by a tube-like housing 411. The first area 310 includes a plurality of first nozzles 416 located in a cavity formed by the housing 411. The first nozzles 416 receive the first portion of the oxidant supply gas 42 from the inlet 222A and form respective oxidant jet streams. The housing 411 further defines an inlet 413 for entraining a portion 16A of the anode exhaust gas (unspent fuel) supplied via the inlet 222C by means of the jets formed by the first nozzles 416.

The anode exhaust gas (unspent fuel) 16A and 16B is introduced into a cavity 421 formed by the second area 320 surrounding the first area 310 and including the second nozzles 326. The oxidant supply gas from the blowers passing through the first and second nozzles 416 and 326 of the first and second areas 310 and 320, respectively, forms oxidant jets that entrain and pump the anode exhaust gas (unspent fuel), thereby producing the desired educting effect in the MEO system 20. Generally, the first and second areas 310 and 320 vie for the same volume of the anode exhaust gas. In some embodiments, to assure that the first area 310 gets a predetermined amount of the anode exhaust gas, the first nozzles 416 are placed in relation to the second nozzles 326 so as to form oxidant jet streams in the first area 310 upstream relative to the jet steams formed in the second area 320.

As discussed above, the first area 310 of the mixer/eductor 220 utilizes a smaller portion (first portion) than the second area 320 (second portion) of the total oxidant supply gas conveyed to the MEO system 200 via the inlet 222A from a common plenum chamber. In other embodiments, air or oxidant supply gas is supplied to the MEO system from two different inlet pipes which are connected to different valves or blowers so that one inlet pipe supplies the first portion of the oxidant gas to the first area 310 and the other inlet pipe supplies the second portion of oxidant gas to the second area 320. In certain exemplary embodiments, the first portion of the total oxidant supply gas supplied to the first area 310 is between 0.5% and 10% of the total oxidant supply gas. Although in the illustrative embodiment shown in FIG. 4, the first and second areas (310, 320) receive oxidant supply gas from a common supply line or plenum chamber, in other embodiments, separate supply lines or plenum chambers may be used to provide the respective first and second portions of the oxidant supply gas to the first and second areas, respectively.

The relative cross-sectional areas of the first nozzles 416 supplying the oxidant supply gas in the first area 310 and of the second nozzles 326 supplying oxidant supply gas in the second area 320 and the number of the nozzles used in each of the areas determine the ratio of the first portion of oxidant supply gas conveyed to the first area 310 and the second portion of oxidant supply gas conveyed to second area 320, and thus, are selected accordingly. In particular, by properly selecting the number of first and second nozzles 416 and 326, their respective cross-sectional areas or diameter, shape, length, and/or their placement, the rate at which the anode exhaust gas is entrained into the first area 310 and into the second area 320 and the oxidant jet streams in these areas can be manipulated. Although in the depicted embodiments of FIGS. 4 and 5, four first nozzles 416 and four second nozzles 326 are used in the first area 310 and second area 320 respectively, more or fewer nozzles may be used in each of the areas. The effectiveness of the MEO system, and in particular the local stoichiometry of the first and second areas, is affected by the selection of the nozzles. For example, using a large number of smaller diameter nozzles will entrain the anode exhaust gas more quickly and decrease the local stoichiometric ratio, while moving to a single larger nozzle would decrease the local stoichiometry. By properly selecting the size, spacing, and quantity of the first and second nozzles, the local stoichiometry can be manipulated in each area to the desired levels. Because of space constraints, the exemplary configuration of four first nozzles and four second nozzles was selected, although systems comprised of up to six first nozzles were evaluated. In addition, angling of the nozzles from an axial position can impact the mixing, however the confined volume of the various areas in the MEO system may preclude or limit the angling of the nozzles. Another parameter that impacts the results and in particular the entrainment of the anode exhaust gas and the local stoichiometry, is the clocking of the various inlets and nozzles. For example, different levels of mixing can be achieved by positioning the anode gas inlet port 222C, the aperture(s) in the first area housing 413, and the second nozzles 326 to maintain symmetry or to permit line of sight flow paths for the anode gases.

Once the desired volume of anode exhaust gas containing unspent fuel has been entrained into the first area 310, the housing 411, enclosing the first area 310, prevents entrainment of additional anode exhaust gas. Openings 413 provided in the housing limit the amount of anode exhaust gas that can be mixed with the oxidant gas jets formed in the first area 310. In the present illustrative embodiment, the openings 413 are provided in the lower portion of the housing as 2 holes 180° apart and ¾" in diameter. However, in other embodiments, the number, positioning and size of the openings 413 may be varied depending on the desired flow of the anode exhaust gas and the configuration of the housing. By properly selecting the number, size, and placement of these openings, the oxidant to fuel ratio attained in the first area can be controlled. In addition, shutter(s) placed over the opening(s) may be employed so as to provide an opening with a variable area, and the extent of opening or closing of the shutter(s) may be connected to an external control system.

If the gas velocity of the stream exiting from the first area 310 into the second area 320 were to exceed the flame propagation speed of the mixture, the flame may lift off the pilot burner tip, thereby making combustion in the second area less stable because the flame front will not be anchored to a solid surface (i.e. the tip of housing 411). In particular, as the flame reaction propagates through the first area 310 toward the end or tip of the housing of the first area 310, the flow of gas through the nozzles 416 pushes the flame away from the nozzles. If the gas velocity exceeds the flame velocity, then the flame moves away from the nozzles and from the tip of the housing until a point where the gas velocity slows down due to mixing and becomes equal to the flame velocity. When the flame is suspended in mid-air, its distance from the housing tip will change as the gas flow rates change. As a result, this condition is less stable than when the flame front is attached to a stationary object because any perturbation in the flow system can cause the flame to quickly move away from the housing tip and to become extinguished. To ensure the stability of the combustion state in the second area 320, the diameter and length of the housing 411 enclosing the first area 310 are selected so as to provide adequate mixing of unspent fuel in the anode exhaust gas and oxidant supply gas in the first area 310 and to assure a reduced velocity of the mixture in the first area 310 at the exit from the housing 411 to maintain an attached flame to the housing exit. In particular, by adequately mixing the anode exhaust and the oxidant supply gas in the first area, the oxidant jets slow down and the entrained anode exhaust gas speeds up so as to result in an average reduced velocity.

Figure 6A:
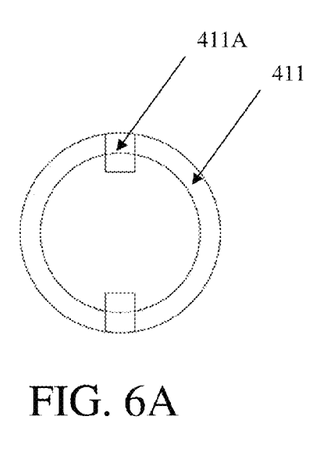
FIGS. 6A and 6B show an illustrative configuration of a housing end of the first area of the MEO system.
Figure 6B:
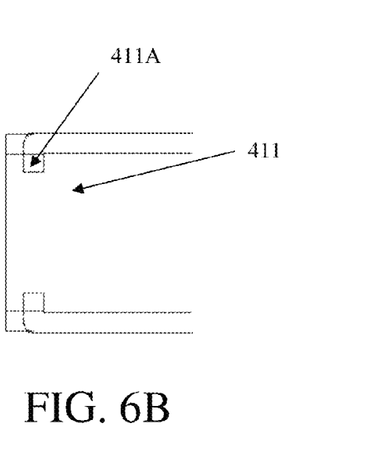

Further, in some embodiments, one or more flame retention rods are placed in the gas stream of the first area 310 to further stabilize the combustion reaction and to maintain the flame attached to the pilot burner tip. For example, as shown in the illustrative embodiment of FIGS. 4 and 5, two wires 412 crossing the stream may be placed in the first area 310, at or near the exit of the housing 411, to enhance the tenacity of the flame and to minimize the impact of ambient drafts or other conditions that may otherwise compromise the attachment of the flame to the pilot burner. In alternative embodiments, two to four pairs of notches about ¼" long (not shown) are cut into sidewall(s) of the housing 411 and the sidewall between each pair are bent inward to disturb the flow exiting the housing and provide the bluff body effect. The size and number of notches provided in the sidewalls of the housing may vary depending on the flow requirements within the housing. An illustrative configuration of a housing end with tabs 411A created by slotting or cutting the end of the housing sidewall and bending the sidewall portions between the cuts or slots inwardly is shown in FIGS. 6A and 6B. The tabs 411A disrupt the flow of gas and act as a point to which the flame can attach.

In accordance with the invention, the geometry of the MEO system components, such as nozzle sizes, apertures, etc., controls the supply and velocity of oxidant supply gas and entrainment of the anode exhaust gas into the first and second areas of the mixer/eductor. However, in certain embodiments, as shown in FIGS. 1-4, the MEO system may include a control assembly 450 for controlling at least the supply of oxidant supply gas to mixer/eductor and/or to the first and second areas 310, 320 of the mixer/eductor. In some embodiments, the control assembly 450 also controls the supply of anode exhaust to the mixer/eductor 22 and/or to the first and second areas 310, 320. In particular, the control assembly 450 controls the amount or flow rate of the oxidant supply gas conveyed to the common plenum chamber which provides the oxidant supply gas to the mixer/eductor and in some embodiments, the control assembly 450 also controls the amount and/or flow rate of oxidant supply gas conveyed to the first nozzles 416 of the first area 310 so as to achieve the desired oxidant to fuel ratio and gas flow in the first area 310. In some embodiments, the control assembly 450 may also control the amount and/or flow rate of oxidant supply gas conveyed to the second nozzles 326 of the second area 320. Moreover, in some embodiments, the control assembly 450 also controls the amount/flow rate of anode exhaust conveyed to the mixer/eductor via the inlet 222C so as to achieve the desired oxidant to fuel ratio and gas flow in the first area 310, and may also control the amount and/or flow rate of the oxidant supply gas conveyed to the first area 310 and/or to the second area 320. The control assembly 450 includes one or more flow control members (not shown), such as valves and the like, for controlling the flow of oxidant supply gas and/or anode exhaust to the mixer/eductor and/or to the individual first and second areas of the mixer/eductor. The control assembly 450 further includes a controller (not shown) for controlling the flow control member(s) so that the gas mixture in the first area 310 has the desired oxidant to fuel ratio and so that the gasses flowing through the first and second areas 310 and 320 have desired gas velocities.

Generally, after the fuel cell system is heated up and is ready to produce power, the combustion conditions change dramatically. While at the hot standby power level, the fuel cell temperature is maintained at a high temperature, but the fuel cell produces no power, i.e. zero power operation. The supplied air or oxidant gas provided to the cathode side is heated to 900° F. and the fuel cell anode exhaust has a high BTU content (~176 Btu/ft3) and a high temperature, around 1050° F. The fuel flow is reduced at these conditions to a level just high enough to prevent oxidizing gases from leaking into the anode side of the fuel cell and to finish heating the incoming air or oxidant supply gas to the operating temperature of the fuel cell. Additionally, if a cathode recycle loop or a fired air heater is used, the oxygen content of the incoming air is reduced as well. Although the fuel content in the MEO is lean during hot standby operation, the overall ignition condition is fairly stable and a previously extinguished flame can re-ignite, primarily due to the high reactant temperatures and the low velocities of the fuel stream.

However, as the fuel cell system increases power production, the fuel flow increases as well. As a greater portion of the fuel is directly converted into electricity in the fuel cell stack, the heating value of the anode exhaust decreases (~50 Btu/ft3). Consequently, the overall mixture of anode exhaust and oxidant supply gas in the MEO releases less heat, making it more difficult to burn the unspent fuel in the mixture. Additionally, the fuel cell stack produces heat as a by-product of the fuel cell reaction, and thus, the oxidizer outlet gas now must help cool the fuel cell stack when it is conveyed through the cathode rather than heating it. To accomplish this, the eductor inlet air temperature is no longer heated or blended with the high temperature cathode exhaust gas, i.e. smaller portion of the cathode exhaust or no cathode exhaust is recycled to the MEO, causing an increase in the oxygen concentration and a drop in the temperature of the oxidant supply gas supplied to the MEO. The combination of the higher anode gas velocity, lower heating value of the unspent fuel, and lower temperature of the oxidant supply gas significantly decreases combustion stability in the MEO. That is, during full power high temperature operation, the most advantageous conditions for making power become the most difficult conditions for maintaining the combustion stability in the MEO.

Therefore, to assure a better overall performance of the fuel cell system, the fuel cell performance needs to be optimized at the full power operating mode/level. The hot standby and the other power levels are merely transition points for the fuel cell system to full power operating level. The MEO system, designed in accordance with the above-discussed principles, provides stable ignition over a wide variety of the fuel cell operating conditions and optimizes the fuel cell performance at the full power operating level, thereby optimizing the overall performance of the fuel cell system.

Figure 7:
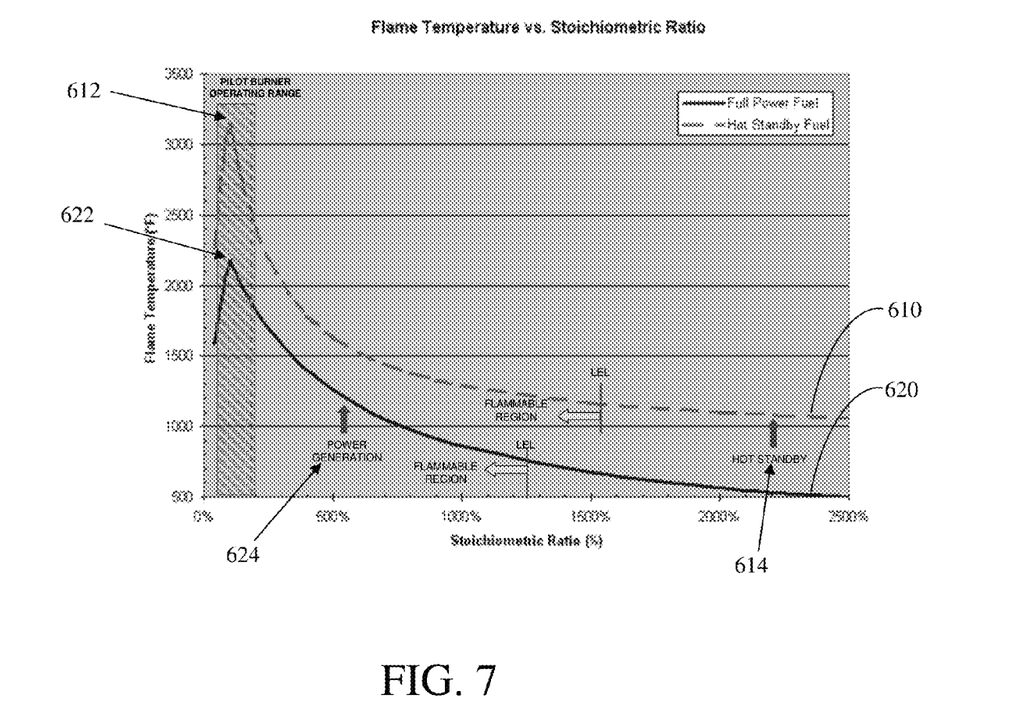
FIG. 7 is a graph showing calculated adiabatic flame temperature for the fuel cell anode exhaust composition at the hot standby operation level and the full power operation level over a range of oxidant to fuel ratios.

Fuel composition of the anode exhaust gas provides a reference point that can be used to define the power levels of the fuel cell system. By defining the power levels of the fuel system relative to the fuel composition of anode exhaust, the ease of combustion and required quantities of air can be determined so as to achieve the benefits for the overall process. The fuel composition starts at a higher caloric or heating value during the hot standby state and degenerates to lower caloric or heating values as the power level of the fuel cell system increases. In this way, the flow rates of air and cathode exhaust for use in the oxidant supply gas are controlled and the flow rates of the anode exhaust and of the oxidant supply gas to the MEO and/or to the first and/or second areas of the MEO are controlled based on the power levels of the fuel cell system FIG. 7 shows a graph of calculated adiabatic flame temperature for fuel compositions of the anode exhaust at hot standby operation level (610) and at full power operation level (620) over a range of oxidant to fuel ratios relative to the stoichiometric ratio. The peak temperatures 612 and 622, and consequently more stable combustion conditions, occur proximate to the oxidant to fuel ratios at 100% of the stoichiometric ratio level. As shown in FIG. 7, the normal "well mixed" stoichiometry of the mixer/eductor operation puts these values far to the right at 500% and 2200% of the stoichiometric ratio. Due to the low fuel flow and high oxidant flow during the hot standby operation, the normal stoichiometry of the hot standby operation level is outside the flammable limits of the mixture. However, high reactant temperatures and poor mixing permit these reactants to combust during normal operations.

To optimize the performance of the fuel cell and ensure stability of the combustion state for all operating levels, only a small fraction of the total MEO system oxidant supply gas (e.g., 0.5 to 10%) is diverted to the first area 310, where it is mixed with a larger proportion of anode exhaust containing unspent fuel. This enables the MEO system to achieve conditions closer to the stoichiometric ratio (between 50% and 200% of the stoichiometric ratio) within the first area 310. This also causes the remaining gases supplied to the second area 320 to form a leaner mixture, having a higher oxidant to fuel ratio of about 500% to 700% of the stoichiometric ratio. The increase in the temperature in the first area 310 thermally catalyzes the second area 320 and ensures that the combustion occurs more reliably than if the MEO system were to utilize just one overall combustion area.

In the described configurations of the MEO system, the stoichiometry of the first area 310 changes as the fuel cell system goes from the hot standby operation level to the full power operation level. At the hot standby operation level, the mixture in first small area 310 is near the 100% stoichiometric level or fuel rich (<100%). As the fuel cell system progresses to full power operation level, the oxidant to fuel ratio in the first area 310 increases. However, this increase is targeted to be no more than to 200% of the stoichiometric ratio and thus, the oxidant to fuel ratio of the mixture in the first area 310 is still significantly below that of the oxidant to fuel ratio of the mixture in the second area 320 and the overall oxidant to fuel ratio. Because the sizes of the nozzles in the mixer/eductor are fixed by design and the mixture during full power operation is expected to become leaner than at hot standby operation, the mixer/eductor is configured so that the oxidant to fuel ratio of the mixture in the first area 310 during full power operation is close to 100% stoichiometric or slightly over 100% so as to ensure most stable operation. In this manner, the first area 310 continues to serve as the ignition source for the second area 320, thereby ensuring stability of the combustion reaction at the full power operating level of the fuel cell.

EXAMPLE

The configurations of the housing and nozzles for the mixer/eductor may vary depending on the size and requirements of the fuel cell system or module. An exemplary mixer/eductor designed for a 100 kW molten carbonate fuel cell stack includes four first nozzles in the first area enclosed by a housing and four second nozzles in the second area. In the first area, each of the four first nozzles has a diameter of 0.125 inches resulting in a flow cross-sectional area of 0.049 $in^2$ and the nozzles are spaced 3.4 nozzle diameters apart. This spacing between the nozzles is defined as distance measured between the centers of adjacent nozzles. In the second area, each of the four second nozzles has a diameter of 1.38 inches resulting in a flow cross-sectional area of 5.98 $in^2$ and the nozzles are spaced 2.1 nozzle diameters apart. The housing enclosing the first nozzles has a diameter of 1.049 inches and is recessed by ½ inch from the second air nozzle exit. The housing includes two openings at 180° apart near the inlet end of the housing. Each of the two openings has a diameter of 0.75 inches.

In this exemplary configuration, the first and second oxidant nozzle diameters define the split of the oxidant gas flow to the first and second areas. The split of the anode exhaust gas by entrainment into the first and second areas is dependent on the nozzle diameters, the size of the openings in the housing and other factors.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A mixing/educting method for use with a fuel cell system having an anode-side and a cathode-side and for mixing and at least partially combusting an anode exhaust gas output from the anode-side and an oxidant supply gas, said method comprising:

receiving and mixing a first portion of anode exhaust gas and a first portion of oxidant supply gas to form a first mixture in a first area and to initiate a combustion reaction in the first mixture;

receiving and mixing a second portion of anode exhaust gas and a second portion of the oxidant supply gas to form a second mixture in a second area coupled to the first area, said first mixture having a first oxidant to fuel ratio smaller than a second oxidant to fuel ratio of the second mixture, and the first area providing an ignition source to promote continuous combustion of the second mixture in the second area.

2. The method of claim 1, wherein the first portion of oxidant supply gas mixed in the first area is between 0.5 and 10 percent of the oxidant supply gas.

3. The method of claim 1, wherein the oxidant to fuel ratio of the first mixture formed in the first area is between 50 and 200 percent of a stoichiometric ratio and the oxidant to fuel ratio of the second mixture formed in the second area is between 500 and 2200 percent of the stoichiometric ratio.

4. The method of claim 1, wherein:

the step of receiving and mixing a first portion of anode exhaust gas and a first portion of oxidant supply gas comprises receiving the first portion of oxidant supply gas in one or more first air nozzles disposed in the first area and forming one or more first oxidant streams and entraining the first portion of the anode exhaust through one or more anode exhaust inlets formed in a housing enclosing the one or more first air nozzles; and the step of receiving and mixing a second portion of anode exhaust gas and a second portion of the oxidant supply gas comprises receiving the second portion of oxidant supply gas in one or more second air nozzles disposed in the second area and forming one or more second oxidant streams.

5. The method of claim 1, further comprising controlling at least one of: the oxidant supply gas flow to the mixer/eductor assembly and the flows of the first and second portions of the oxidant supply gas provided to the respective first and second areas such that the first mixture has the first oxidant to fuel ratio in the first area.

6. The method of claim 5, wherein the step of controlling further includes controlling at least one of: anode exhaust gas flow provided to the mixer/eductor assembly and the flows of the first and second portions of anode exhaust gas provided to the respective first and second areas.

7. The method of claim 1, further comprising outputting one of the first mixture and a gas derived from the first mixture from the first area to the second area.

8. The method of claim 1, further comprising combusting the first mixture in the first area and outputting a gas derived by combusting the first mixture from the first area to the second area so as to propagate the combustion reaction to the second mixture in the second area.

* * * * *